(12) United States Patent  (10) Patent No.: US 8,242,662 B2
Hazelwood  (45) Date of Patent: Aug. 14, 2012

(54) SPECIAL THERMO MAGNETIC MOTOR DEVICE

(76) Inventor: John Hazelwood, Milan, IN (US)

( * ) Notice: Subject to any disclaimer, the term of this patent is extended or adjusted under 35 U.S.C. 154(b) by 201 days.

(21) Appl. No.: 12/753,893

(22) Filed: Apr. 4, 2010

(65) Prior Publication Data

US 2010/0253181 A1   Oct. 7, 2010

Related U.S. Application Data

(60) Provisional application No. 61/211,999, filed on Apr. 6, 2009.

(51) Int. Cl.
*H02N 10/00* (2006.01)
(52) U.S. Cl. ........................................... 310/306
(58) Field of Classification Search .................. 310/306, 310/307; *H02N 10/00, 6/00*
See application file for complete search history.

(56) References Cited

U.S. PATENT DOCUMENTS

| | | | |
|---|---|---|---|
| 375,408 A | 12/1887 | Acheson | |
| 380,100 A | 3/1888 | Edison | |
| 396,121 A | 1/1889 | Tesla | |
| 428,057 A | 5/1890 | Tesla | |
| 476,983 A | 6/1892 | Edison | |
| 1,431,545 A | 10/1922 | Schwartz | |
| 2,016,100 A * | 10/1935 | Schwarzkopf | 310/306 |
| 3,445,740 A | 5/1969 | Merkl | |
| 3,743,866 A * | 7/1973 | Pirc | 310/306 |
| 4,447,736 A | 5/1984 | Katayama | |
| 4,730,137 A * | 3/1988 | Vollers | 310/306 |
| 2004/0027774 A1 * | 2/2004 | Takizawa et al. | 361/143 |

FOREIGN PATENT DOCUMENTS

| | | | |
|---|---|---|---|
| JP | 56157280 A | * | 12/1981 |
| JP | 05268782 A | * | 10/1993 |

* cited by examiner

*Primary Examiner* — Quyen Leung
*Assistant Examiner* — Thomas Truong
(74) *Attorney, Agent, or Firm* — Ritchison Law Offices, PC; John D Ritchinson (57) ABSTRACT

A special thermo magnetic motor which is an electromagnetic heat engine used for directly converting power between heat and electrical forms using magnetism. It is comprised of a unique combination of a base support, a heating system to heat the magnetic wafers to the Curie temperature; a magnet system with a base and shorting bar; a rotatable disk assembly with the magnetic wafers and a support shaft/transfer means; and an output to an output means to the using device. It provides significant benefits compared to prior art devices and is used for driving various other devices.

11 Claims, 12 Drawing Sheets

Fig. 1

Fig. 3 Section AA

Fig. 4

Fig. 5
Section BB

SPECIAL THERMO MAGNETIC MOTOR DEVICE

CROSS-REFERENCE TO RELATED APPLICATIONS

This application claims the benefit of Provisional Patent Application Ser. No. 61/211,999 filed Apr. 6, 2009 by John Hazelwood and entitled "Special Thermo Magnetic Motor Device".

FIELD OF INVENTION

This invention relates to a Special Thermo Magnetic Motor Device for Actuating and Driving Various Other Devices. Particularly this new Special Thermo Magnetic Motor Device generally relates to magnetic heat engines. More particularly, it is concerned with an electromagnetic heat engine for directly converting power between heat and electrical forms using magnetism. This Special Thermo Magnetic Motor Device is a new combination of existing materials configured with unique features that provide an effective, practical and economical way to provide a thermo magnetic motor or engine device. The preferred and alternative embodiments are described below.

FEDERALLY SPONSORED RESEARCH: None.

SEQUENCE LISTING OR PROGRAM: None.

BACKGROUND-FIELD OF INVENTION AND PRIOR ART

A. Introduction of the Problems Addressed

The problem solved involves one related to a long felt need in the electromagnetic field involving energy transfer. Science and engineering leaders for the last two (2) centuries have attempted to provide a thermo magnetic device and have failed to get favorable efficiencies with the device. This new configuration overcomes those past shortfalls.

The most basic and simple thermo magnetic devices involve iron (ferro) derivatives or other magnetic materials. Iron while under magnetic attraction is heated until it falls away. Upon cooling it is again magnetically attracted. The particular combinations of materials and features are unique and novel and are not anticipated by prior art. Likewise, use of a Special Thermo Magnetic Motor Device provides significant benefits compared to prior art devices.

Much of the electrical power generated today comes from conversion of heat using steam turbo-generators. Magneto-hydrodynamic and magneto-caloric schemes, while reducing the solid moving parts, still involve an intermediate mechanical form as kinetic energy in a fluid medium, and furthermore, require the medium to be magnetic and conductive at the same time. The flow of fluids is particularly difficult to model and control, and in the above methodologies, the work transfers occur primarily through the physical boundary of the medium, which limits the throughput. Efficiency of the system is reduced. The prior art lacks a heat engine in which the work transfer is not confined by the surface of the medium, and which converts heat to electricity directly without involving any intermediate mechanical form whatsoever.

Magnetism is made particularly difficult by the lack of a magnetic analog of the kinetic theory of gases and by the multitude of units and conventions. Among the defects in the prior perception is the relative lack of interest in para magnetism, the gaseous state of magnetization. Ferromagnetism basically means easier saturation, and holds even less energy than para magnetism for a given magnetization intensity. Very high intensity fields are therefore needed in prior art thermo magnetic engines to obtain useful power densities. Therefore, restated, as far as known, there is no other Special Thermo Magnetic Motor Device at the present time which fully provides these improvements and functional characteristics as the present Special Thermo Magnetic Motor Device.

B. Prior Art

The historical technology focused on devices that only helped with fairly expensive and complex designs. Hitherto only a mechanical means have been used for the work transfers in magnetic engines, though they have been known for over a century since Nikola Tesla's Thermo-Magnetic Motor [U.S. Pat. No. 396,121, issued 15 Jan. 1889]. In this device, the mechanism of inductive work transfer had not been conceived of for want of a negative resistance model of power generation. Inadequate thermodynamic insight is also partly to blame for the slow development of magnetic engines. An earlier device is shown by a 1887 U.S. Pat. No. 375,408 issued to Acheson that descried an assembly for rapidly turning or "whirling" conductive wires through a magnetic field where the wires are heated somehow by a gas burner. It lacked any transfer of the output energy to a using means and used conductors passing through the magnetic field rather than wafers being demagnetized and effected by the heat presence. A device was issued as U.S. Pat. No. 380,100 (1888) to Edison. The device called a pyromagnetic motor had overall features and combinations that are very complex. Also it was a direct current device.

Another pyromagnetic device was issued as U.S. Pat. No. 476,983 (1892) to Edison. The overall features and combinations of the device are also very complex and associated with a series of windings rather than simple wafers as part of the transformation means. The device differs greatly from Hazelwood's invention in that is uses a complex system as opposed to a rotational disk with magentizeable wafers. Another transforming device by Tesla is shown in U.S. Pat. No. 428,057 (1890). This device is a complex series of windings exposed to a thermo source. It fails to anticipate the present device.

A magnetic distortion motor in U.S. Pat. No. 1,431,545 (1922) was issued to Schwartz. Here the prior art teaches a method that involves a complex series of electrical conductive windings, heat and cold creating elements, multiple internal and external poles (to the magnetizeable disk), a moveable support means and a core made of steel laminations. Extremely complex compared to Hazelwood's device with relatively fewer and less-moving parts. A more recent device for a Thermo-Magnetic motor is taught by U.S. Pat. No. 3,445,740 (1969) issued to Merkl. This device taught a rotational, heated device that promoted the use of more expensive type of permanent magnets that were processed and effected by the heating cycles. Another recent idea is taught by Pirc in a U.S. Pat. No. 3,743,866 (1973) called a rotary Curie point magnetic engine. It shows a rotary magnetic engine in which Gadolinium as a transition material distorts lines of flux in a magnetic field to cause relative movement between a rotor and a stator. Magnets are mounted on the rotor and stator, and the Gadolinium metal is disposed in to form of thin spaced-apart laminae between the poles of certain ones of the magnets with passageways formed between the laminae for directing the flow of a coolant fluid. Circuit means is provided to intermittently direct an electrical current through the laminae responsive to movement of the rotor with respect to the stator. This causes the temperature of the laminae to rise above the Curie point of Gadolinium whereby the lines of flux are released from the laminae to create magnetic attraction between opposed magnets to move the rotor. Thereafter the circuit means is opened to permit the coolant medium to cool the laminae below the Curie point so that the lines of flux are captured by the flux distorting means.

Finally, a U.S. Pat. No. 4,447,736 (1984) issued to Katyama teaches a fast rotating ferrite ring engine that is started by an external starting motor generates a medium mechanical power continuously. The system is mechanically dissimilar and more complex than the present invention.

As far as known, there is no other Special Thermo Magnetic Motor Device at the present time which fully provide these improvements and functional characteristics as the present Special Thermo Magnetic Motor Device. It is believed that this device is made with fewer parts with improved configurations and physical features to provide more functionality when compared to other currently utilized thermo magnetic motors or similar rotational devices. To the best knowledge of the inventor, Mr. Hazelwood, it is believed that this combination and use has not been anticipated by other products, patents or combinations of patents in view of each other. The particular combinations of materials and features are unique and novel and are not anticipated by prior art.

SUMMARY OF THE INVENTION

A Special Thermo Magnetic Motor Device has been developed and designed to provide a unique combination that is specifically related to devices and methods to produce a motor or turning device with the combination of heat (thermo) and magnets . . . thus a thermo magnetic device. The Special Thermo Magnetic Motor Device may be used with motors, generators or virtually and driven device that needs power. One skilled in the art recognizes the many ways to use the rotational output or to transform the rotational motion into linear and other forms as needed. The benefits are delineated below.

The preferred embodiment of the Special Thermo Magnetic Motor Device is comprised of a unique combination of a base support, a heating system to heat the magnetic wafers to the Curie temperature; a magnet system with a base and shorting bar; a rotatable disk assembly with the magnetic wafers and a support shaft/transfer means; and an output to an output means to the using device.

Objects and Advantages

There are several objects and advantages of the Special Thermo Magnetic Motor Device. There are currently no known thermo magnetic motor devices that are effective at providing the objects of this invention.

The following TABLE A summarizes various advantages and objects of the Special Thermo Magnetic Motor Device. This list is exemplary and not limiting to the many advantages offered by this new device.

TABLE A

| ITEM | Various Benefits, Advantages and Objects This device: BENEFIT |
|---|---|
| 1. | Comprised of a small number of relatively simple parts. |
| 2. | Utilizes no pistons, crank shafts, camshafts' valves, gears, etc. |
| 3. | Provides a way to use the transformation of magnetic |

TABLE A-continued

| ITEM | Various Benefits, Advantages and Objects This device: BENEFIT |
|---|---|
| | to non-magnetic states for magnetic materials when heat is applied. |
| 4. | May be used with two or more magnets. |
| 5. | Provides a thermodynamic means for directly converting power between heat and electrical forms using magnetism. |
| 6. | Allows use of wider range of magnetic media and operating conditions in magnetic heat engines. |
| 7. | Is versatile to hold various types of magnetic wafer devices. |

Noteworthy is that other advantages and additional features of the present Special Thermo Magnetic Motor Device will be more apparent from the accompanying drawings and from the full description of the device. For one skilled in the art of thermo magnetic motors and other rotating devices, it is readily understood that the features shown in the examples with this device is readily adapted for improvement to other types of mechanisms and devices for use with energy production or transformation.

DESCRIPTION OF THE DRAWINGS-FIGURES

The accompanying drawings, which are incorporated in and constitute a part of this specification, illustrate a preferred and alternative embodiments for the Special Thermo Magnetic Motor Device for Actuating and Driving Various Other Devices. The drawings together with the summary description given above and a detailed description given below serve to explain the principles of the Special Thermo Magnetic Motor Device for Actuating and Driving Various Other Devices. It is understood, however, that the device is not limited to only the precise arrangements and instrumentalities shown.

DESCRIPTION OF THE DRAWINGS-REFERENCE NUMERALS

The following list refers to the drawings:

TABLE B

Reference numbers

| Ref # | Description |
|---|---|
| 31 | General Special Thermo Magnetic Motor Device. |
| 31A | Prototype of a Special Thermo Magnetic Motor Device. |
| 32 | Rotatable Magnetic disk assembly |
| 33 | Magnet |
| 33A | Magnet system |
| 34 | Heating means such as a flame, infrared, solar or the like |
| 35 | Shorting Bar |
| 36 | Magnetic flux lines |
| 40 | 6 way adjustable support for heating means |
| 41 | Heat shield |
| 42 | Assembly or device with Means to provide heat |
| 43 | Control of heating means |
| 50 | Control of immediate heat such as a flame |
| 50A | Flame or focused heat source |
| 50B | Heated wafer assembly |
| 51 | Wafer assembly |
| 51A | Wafer assembly with heat sink |
| 52 | Disk |
| 53 | Disk assembly 32 support shaft and energy transfer means |
| 54 | Disk support assembly |
| 55 | Support assembly X-Y adjustment means |
| 56 | Support assembly vertical (Z) adjustment means |
| 57 | Bearing |
| 61 | Shaft initiator means (to start shaft and assembly turning) |
| 62 | Transfer and isolation means - output means |
| 63 | Driven device or using device such as a motor, generator or the like |
| 64 | Magnet support means (base with features) |
| 65 | Special Thermo Magnetic Motor Device base. |
| 66 | Wafer or button fastener such as a flat head bolt or equal securement means |
| 70 | Heat sink such as copper, aluminum and other heat conducting materials |
| 71 | Wafer or button that is magnetisable or a opermanent magnet with a relatively low Curie temperature |
| 72 | Wafer fastening means such as a hexagon nut or other fastening means |
| 73 | Upward motion of wafer |
| 74 | Rotation of support/turning shaft |
| EC | Eddy current area near shorting bar |
| MG | Minimum gap between Magnet(33) and disk assembly (32) |

DETAILED DESCRIPTION OF PREFERRED EMBODIMENT

The present invention presented is a Special Thermo Magnetic Motor Device 31. Particularly the preferred embodiment of the Special Thermo Magnetic Motor Device 31 is related to devices and methods that provide a unique combination which has been specifically configured to enable a thermo magnetic motor and the like. The preferred embodiment of the Special Thermo Magnetic Motor Device is comprised of a unique combination of a base support, a heating system to heat the magnetic wafers to the Curie temperature; a magnet system with a base and shorting bar; a rotatable disk assembly with the magnetic wafers and a support shaft/transfer means; and an output to an output means to the using device.

Figure 14:
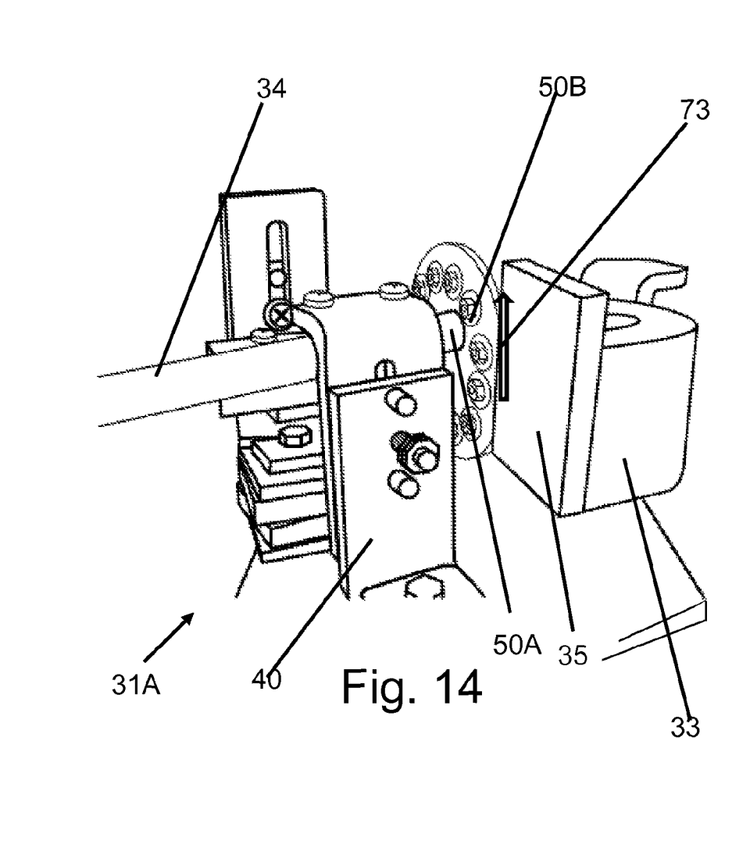
FIG. 14 is a view of a prototype that shows the side view of the device in operation with the heat means operating on the upper buttons.
Figure 15:
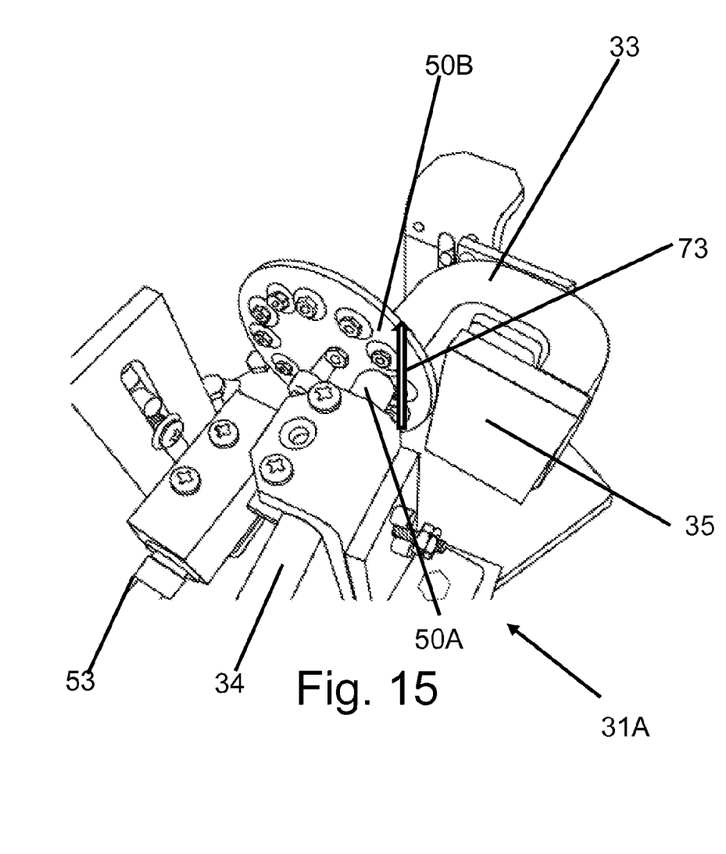
FIG. 15 is a view of a prototype that shows an isometric of the device in operation with the heat means operating on the upper buttons.

There is shown in FIGS. 1-15 a complete detail and operative embodiment of the Special Thermo Magnetic Motor Device 31. In the drawings and illustrations, one notes well that the FIGS. 1-13 detail the special configuration. FIGS. 14 and 15 show the operative use of this invention.

The advantages for the Special Thermo Magnetic Motor Device are listed above in the introduction. Succinctly the benefits are the device:

Is comprised of a small number of relatively simple parts.

Utilizes no pistons, crank shafts, camshafts' valves, gears, etc.

Provides a way to use the transformation of magnetic to non-magnetic states for magnetic materials when heat is applied.

May be used with two or more magnets.

Provides a thermodynamic means for directly converting power between heat and electrical forms using magnetism.

Allows use of wider range of magnetic media and operating conditions in magnetic heat engines.

Is versatile to hold various types of magnetic wafer devices.

The preferred embodiment of the Special Thermo Magnetic Motor Device 31 is comprised of a unique combination of a base support 65, a heating system 34 to heat the magnetic wafers 51 to the Curie temperature; a magnet system 33A with a base 64 and shorting bar 35; a rotatable magnetic disk assembly 32 with the magnetic wafers 51 and a support shaft/transfer means 54; and an output to an output means 62 to the using device 63.

The accompanying drawings, which are incorporated in and constitute a part of this specification, illustrate a preferred embodiment of the Special Thermo Magnetic Motor Device 31. The drawings together with the summary description given above and a detailed description given below serve to explain the principles of the Special Thermo Magnetic Motor Device 31. It is understood, however, that the Special Thermo Magnetic Motor Device 31 is not limited to only the precise arrangements and instrumentalities shown.

Figure 1:
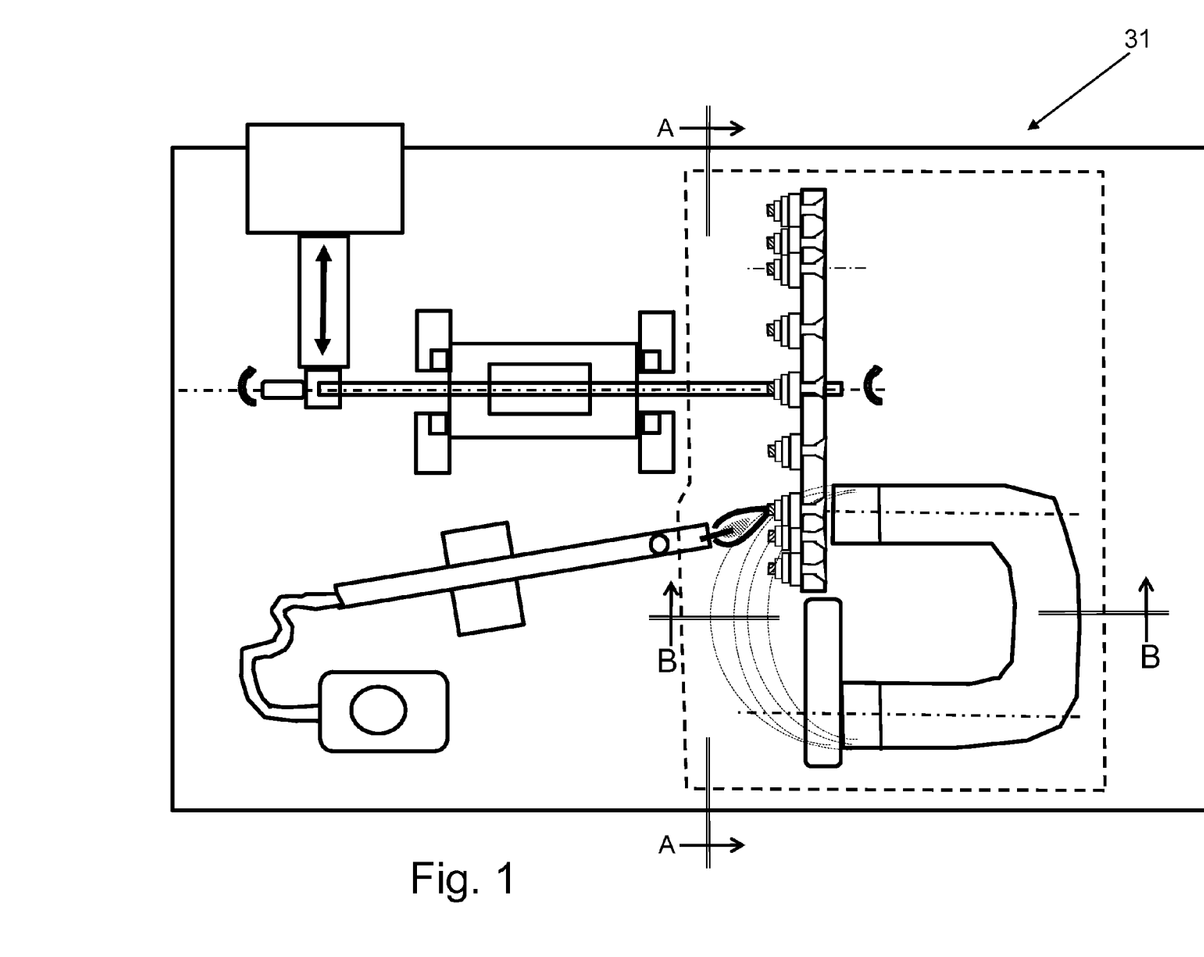
FIG. 1 is the general plan view of the Special Thermo Magnetic Motor Device.

FIG. 1 is the general plan view of the Special Thermo Magnetic Motor Device 31. The various components are shown for example and not limitation in this view. Further views, sections and descriptions of the various components are included below.

Figure 2:
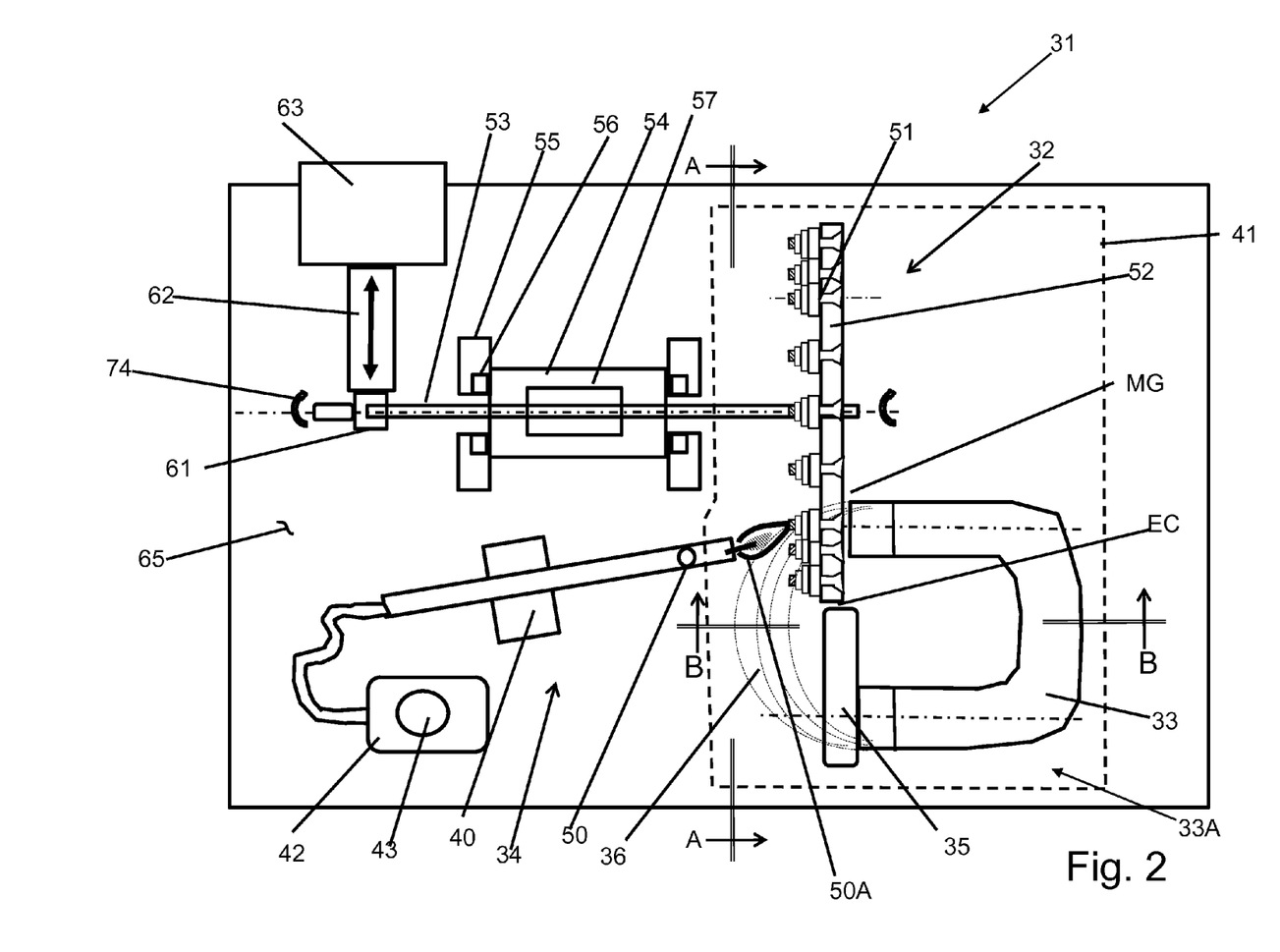
FIG. 2 is the general plan view of the Special Thermo Magnetic Motor Device with many of the components identified.

FIG. 2 is the general plan view of the Special Thermo Magnetic Motor Device 31 with many of the components identified. The heating system 34 comprised of a means to provide heat 42 and a controller 43 is depicted. The heating system 34 is adjusted to provide a flame or focused heat source 50A by the 6-way adjustment means 40 connecting and securing the heat means 34 to the device base 65. The heat source 50A is directed to one of the uppermost wafer assemblies 51 on the magnetic disk assembly 52. The heat source 50A is controlled near the point of heat transfer to the wafer assembly 51 by a control means 50. Further shown in FIG. 2 is the magnet 33 and shorting bar 35. This shorting bar 35 helps to "direct" and control the flux field 36. One skilled in the art sees that the two or more wafer assemblies 51 on the disk 52 are exposed to the magnetic field 36 and the heat source 50A. As the wafer assembly 51 when exposed to the heat source 50A reaches the Curie point, the magnetic pull from the wafer assemblies 51 and the magnet 33 releases since the wafer 51 has reached the point where the magnetic properties are temporarily lost due to the exposure to the high temperatures. When this occurs, the uppermost wafer assembly 51 is "released" and the next lowermost assembly 51 is drawn to the magnet 33, thus causing the magnetic force to propel the disk assembly 32 in an upward rotational direction. The overall heated area is protected by the heat shield 41 around the hot components of the device 31. As the disk assembly 32 is forced to rotate, the support/transfer shaft 53 is attached at the energy end to the wafer assembly 32 and thus also rotates. This transfer shaft 53 is innermost through a bearing 57 and a support means 54 which is adjustably connected and secured by the means 55, 56 to the base 65. The rotatable shaft 53 is secured at the opposite end to a shaft initiator 61 and a transfer and isolation means 62. The initiator 61 permits a "kick start" force to begin the thermo magnetic motor 31 to begin operation if the magnetic force and heat system does not immediately cause rotation to begin. The isolation/transfer means protects the thermo magnetic motor 31 from impact forces at the start of energy transfer as well as providing a means to transfer rotational energy to rotational users or transform to linear or other configurations devices 63. One notes the rotation direction 74 is indicated at the end of the shaft transfer 53.

Figures 3, 4:
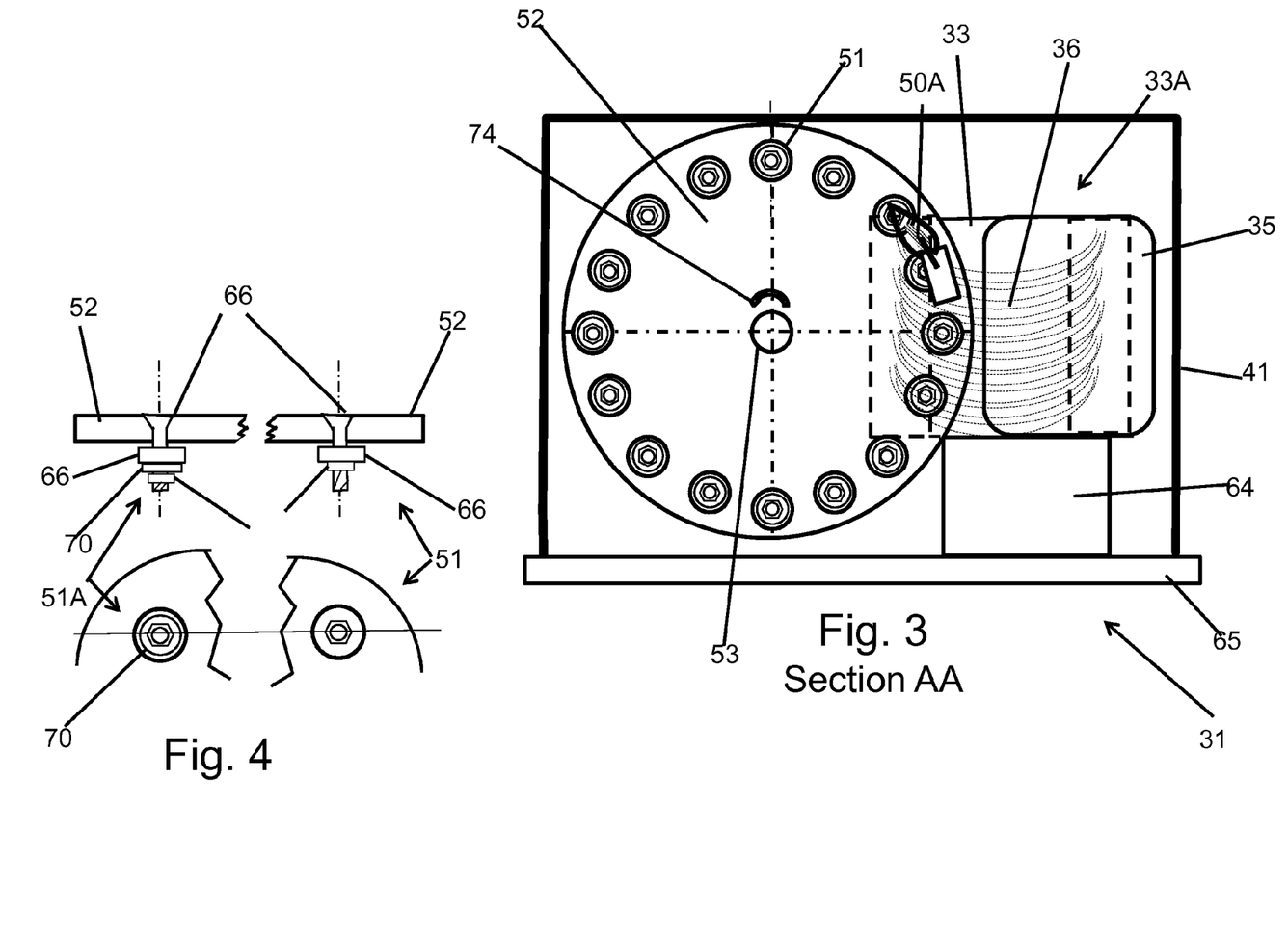
FIG. 3 is Section A-A which shows the front view of the Special Thermo Magnetic Motor Device.
FIG. 4 shows two potential variations of the main wafer elements with and without heat sink components.

FIG. 3 is Section A-A which show the front view of the Special Thermo Magnetic Motor Device 31. Here the wafer assembly 32 is shown comprised of the two or more wafer assemblies 51 and the disk 52. The wafer assembly is described in FIG. 4, below. The disk 52 is comprised of a heat resistant ceramic or equal material that does not change physical properties when exposed to heat from the source 50A. Also show is the flux field 36 and the magnet assembly including the magnet 33, support 64 and the shorting bar 35. The overall heated area is protected by the heat shield 41 around the hot components of the device 31.

FIG. 4 shows two potential variations of the main wafer elements 51, 51A with 51 and without 51A heat sink components 70. In each case 51, 51A, a fastener 66 is inserted through the disk 52. The end opposite the disk 52 is a threaded fastener or an equivalent means to fasten the magnetic wafer 71 to the disk 52 in order to comprise the disk assembly 32. The difference is that with the embodiment 51, a heat sink 70 is attached between the magnetic wafer 71 and the fastener means 52 such as a hex nut or equal. One skilled in the art of fastening well appreciates that the plethora of fasteners and securement means include many mechanical fasteners. Securement by processes such as welding, soldering, friction welding, adhesives, heat shrinks and the like. Also, one skilled in heat transfer recognizes the use of a heat sink 70 next to the wafer 71. This permits the heat from the source 50A to intensify and reach the Curie Point faster—hence permitting the wafer 71 to release from the magnet 33 more quickly (in a shorter period of time). One skilled in materials that are appropriate for heat sinks 70 well appreciate the plethora of metals, composite materials and the like that may serve as a good heat sink member. For example, and not as a limitation, the heat sink 70 might be copper, aluminum, bronze, etc. These are exemplary and not a limitation to the scope and spirit of the Special Thermo Magnetic Motor Device 31.

Figure 5:
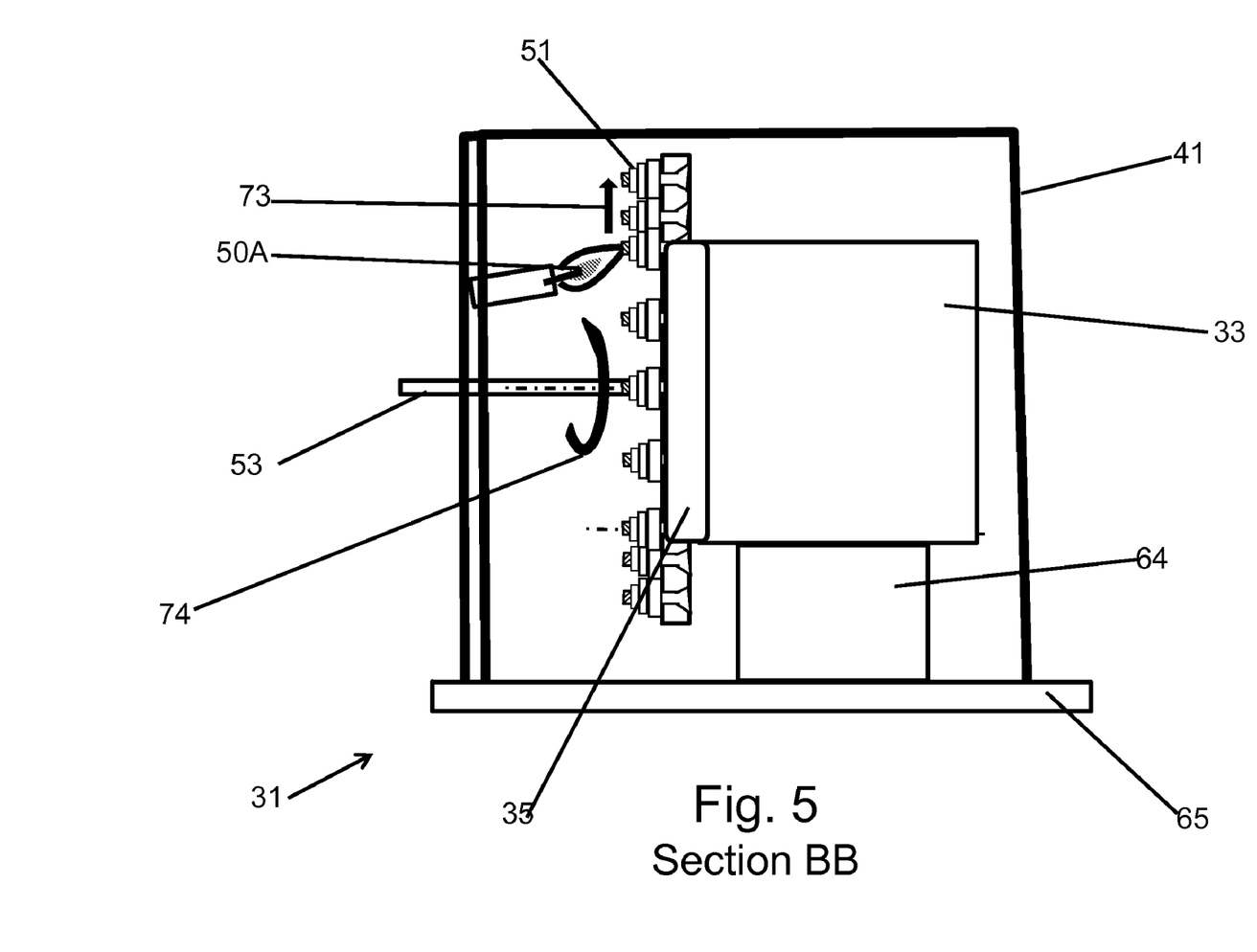
FIG. 5 is Section B-B which shows the side view of the Special Thermo Magnetic Motor Device.

FIG. 5 is Section B-B which shows the side view of the Special Thermo Magnetic Motor Device 31. Again, here the wafer assembly 32 is shown comprised of the two or more wafer assemblies 51 and the disk 52. The wafer assembly is described in FIG. 4, below. The magnet 33, support 64, the shorting bar 35 and the heat shield 41, which is around the hot components of the device 31, are depicted. The device base 65 and the rotational direction 74 of the transfer shaft 53 is shown. Further, the focused heat source 50A is shown on an uppermost wafer assembly 51 which, as it reaches its Curie Temperature, releases from the magnet 33 since it magnetic properties disappear or disengage when the Curie Temperature is reached. At this point the upper most wafer assembly 51 is released from the magnetic attraction of magnet 33 and then the next lower wafer assembly is attracted which causes the disk 52 and wafer assemblies 51 to rotate.

Figure 16:
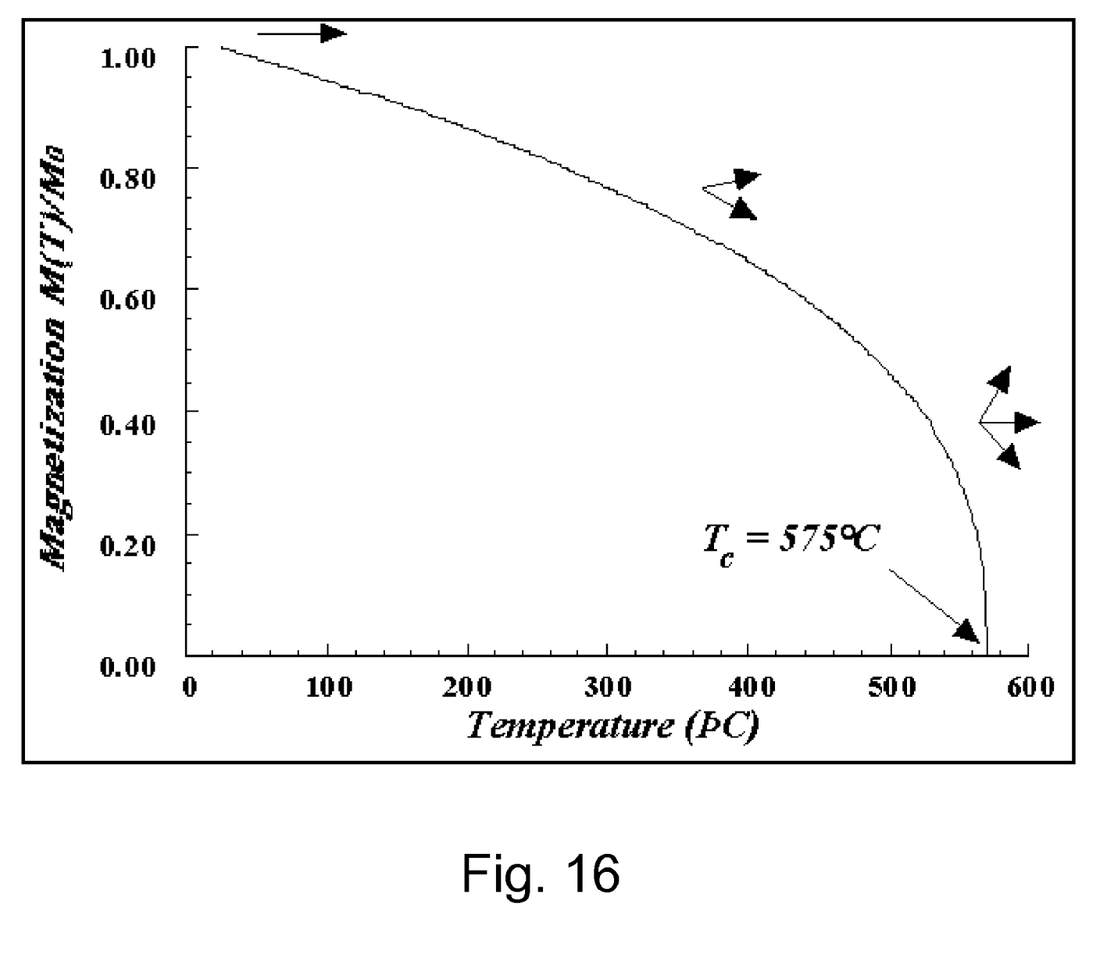
FIG. 16 is a view of a typical plot of magnetization vs temperature for magnetite.

One skilled in the art of magnets well understands the Curie Point and the effect on the magnetic material. Even though electronic exchange forces in ferromagnets are very large, thermal energy eventually overcomes the exchange and produces a randomizing effect. This occurs at a particular temperature called the Curie temperature ($T_C$). Below the Curie temperature, the ferromagnet is ordered and above it, disordered. The saturation magnetization goes to zero at the Curie temperature. FIG. 16 is a view of a typical plot of magnetization vs temperature for magnetite. The Curie temperature is also an intrinsic property and is a diagnostic parameter that can be used for mineral identification. However, it is not foolproof because different magnetic minerals, in principle, can have the same Curie temperature.

Figure 6:
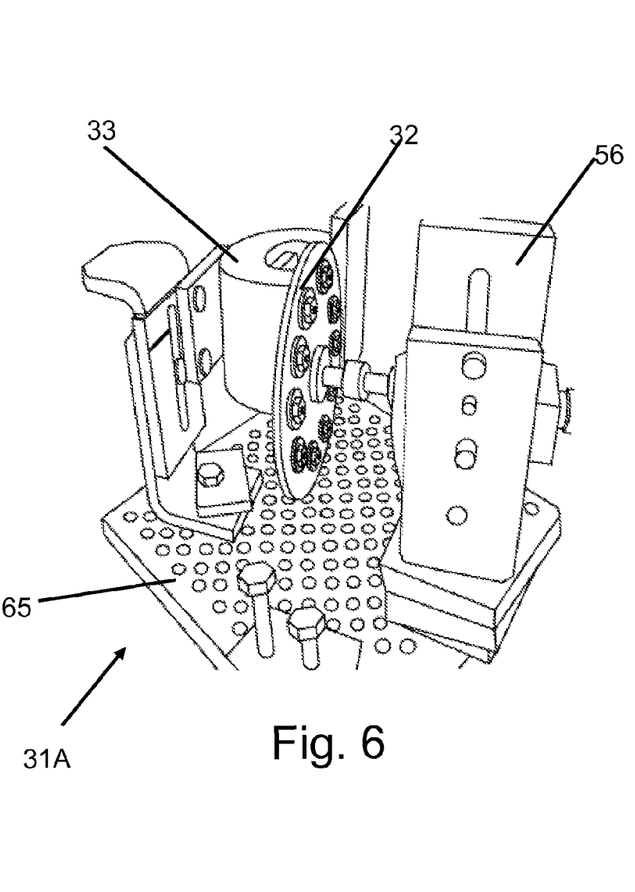
FIG. 6 is a side view of a prototype that shows away from the magnet area of the Special Thermo Magnetic Motor Device.

FIG. 6 is a side view of a prototype that shows away from the magnet area of the Special Thermo Magnetic Motor Device 31A. Here the prototype 31A shows the actual components described above including the magnet 33, base 65, disk assembly 32 and shaft support 40.

Figure 7:
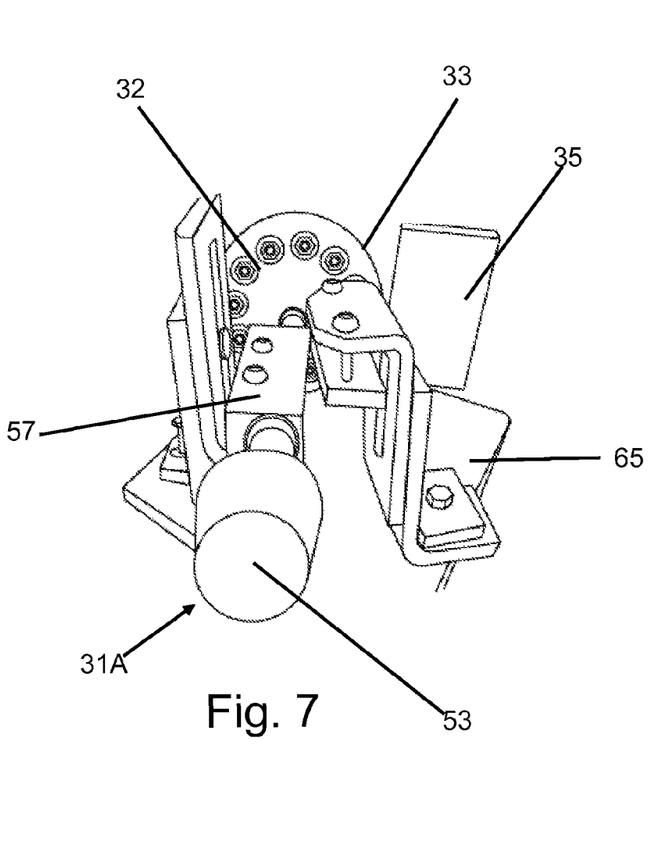
FIG. 7 is a view of a prototype that shows the front view of the Special Thermo Magnetic Motor Device.

FIG. 7 is a view of a prototype 31A that shows the front view of the Special Thermo Magnetic Motor Device 31A. The bearing 57, the output shaft 53 and the device base 65 are depicted in the view.

Figure 8:
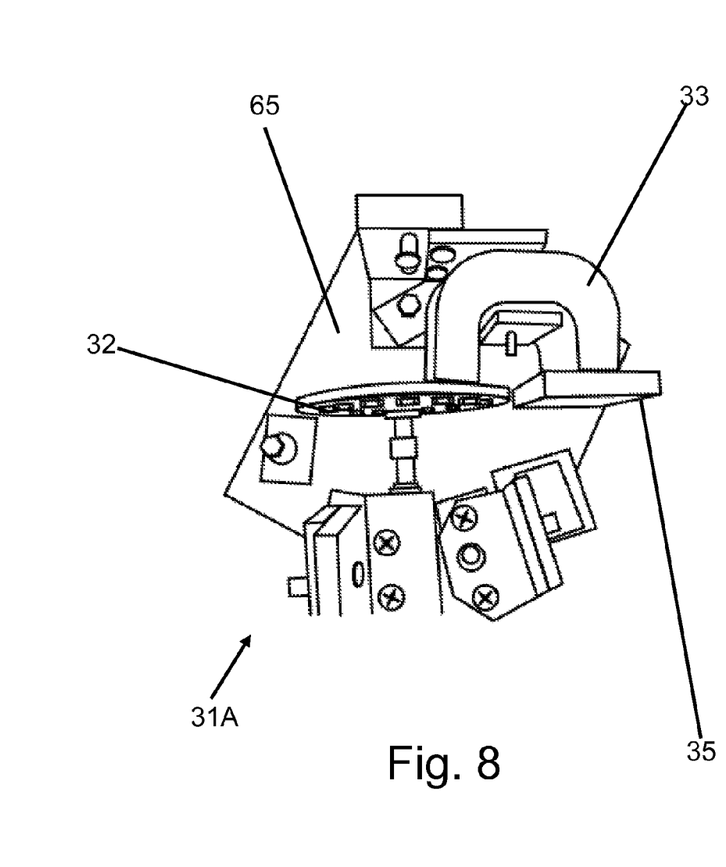
FIG. 8 is a view of a prototype that shows the top view of the Special Thermo Magnetic Motor Device.

FIG. 8 is a view of a prototype 31A that shows the top view of the Special Thermo Magnetic Motor Device. The magnet 33, disk assembly 32, and base 65 are shown.

Figure 9:
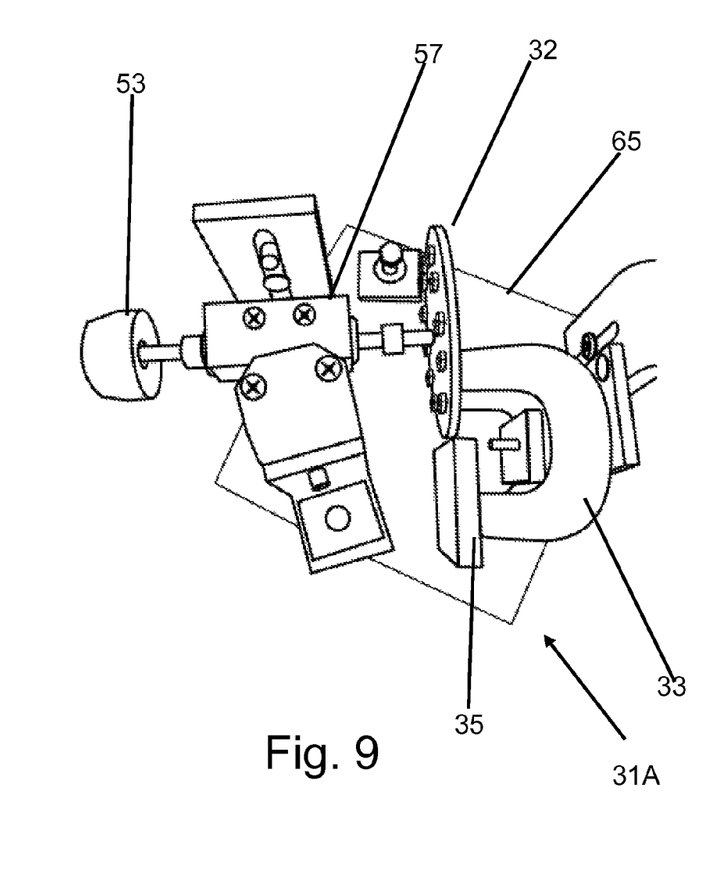
FIG. 9 is another view of a prototype that shows the top view of the Special Thermo Magnetic Motor Device and the driven output shaft of the device.

FIG. 9 is another view of a prototype 31A that shows the top view of the Special Thermo Magnetic Motor Device and the driven output shaft 53 of the device. Additional components described above are also shown in this view.

Figure 10:
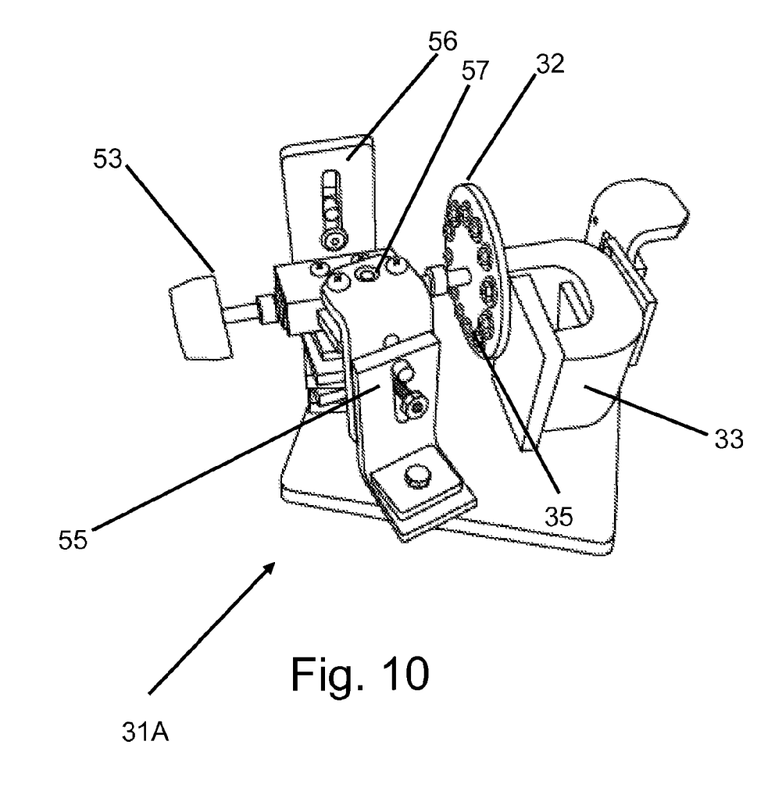
FIG. 10 is a view of a prototype that shows an isometric view of the Special Thermo Magnetic Motor Device including the output shaft.

FIG. 10 is a view of a prototype 31A that shows an isometric view of the Special Thermo Magnetic Motor Device including the output shaft 53.

Figure 11:
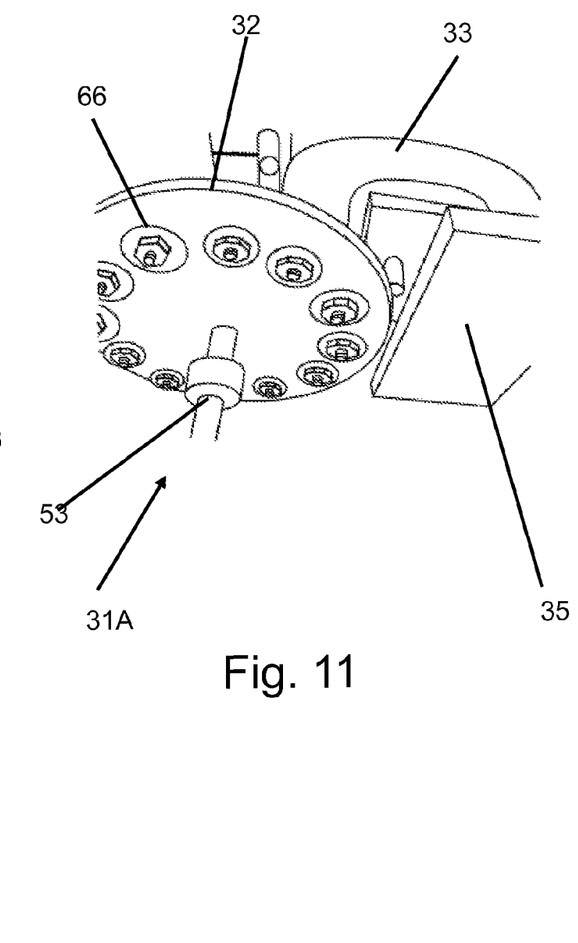
FIG. 11 is a view of a prototype that shows a close up isometric of the front of the main disk of the Special Thermo Magnetic Motor Device.

FIG. 11 is a view of a prototype 31A that shows a close up isometric of the front of the main disk 32 of the Special Thermo Magnetic Motor Device.

Figure 12:
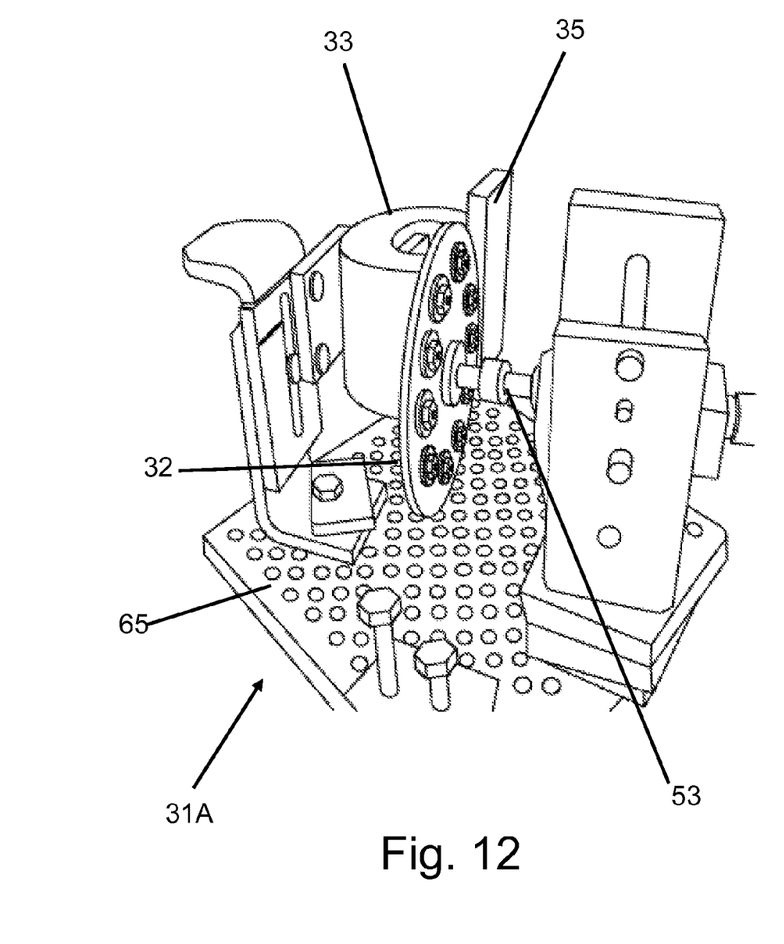
FIG. 12 is a view of a prototype that shows the side isometric away from the magnet area for the Special Thermo Magnetic Motor Device.

FIG. 12 is a view of a prototype 31A that shows the side isometric away from the magnet area 33 and disk assembly 32 for the Special Thermo Magnetic Motor Device.

Figure 13:
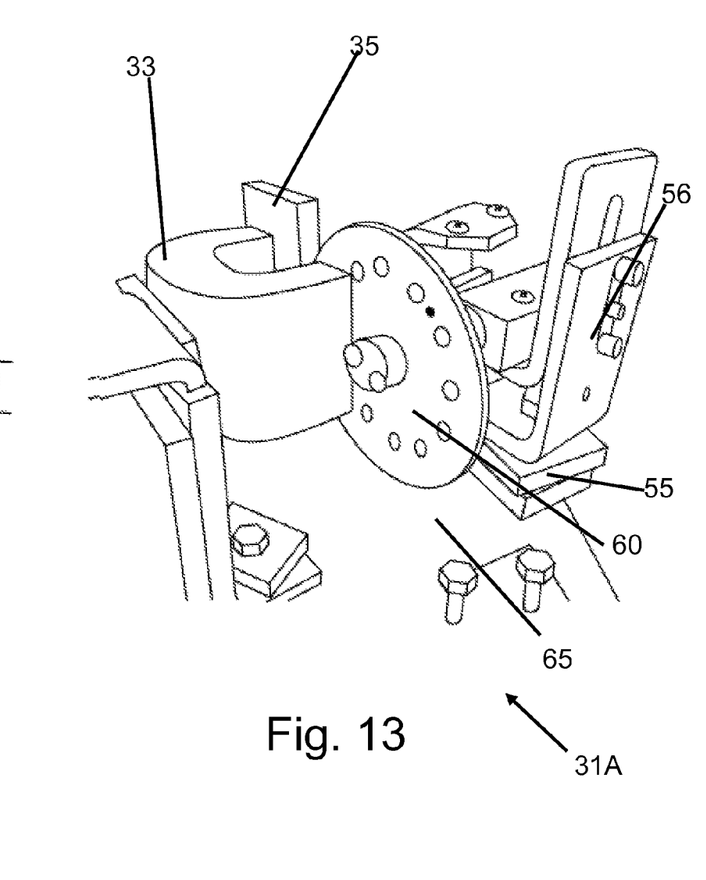
FIG. 13 is a view of a prototype that shows the back view of the Special Thermo Magnetic Motor Device.

FIG. 13 is a view of a prototype 31A that shows the back view of the Special Thermo Magnetic Motor Device. Here the flat fastener 60 and the shaft 53 support attachments 55, 56 are shown.

All of the details mentioned here are exemplary and not limiting. Other components specific to describing a Special Thermo Magnetic Motor Device 31 may be added as a person having ordinary skill in the field of thermo magnetic motors and related rotational-magnetic power producing or transforming devices well appreciates.

Operation of the Preferred Embodiment

The preferred embodiment for the Special Thermo Magnetic Motor Device 31 has been described in the above paragraphs. The manner of how the device operates is described below. One skilled in the art of thermo magnetic motors and related rotational-magnetic power producing or transforming devices will note that the description above and the operation described here must be taken together to fully illustrate the concept of the Special Thermo Magnetic Motor Device 31.

The preferred embodiment of the Special Thermo Magnetic Motor Device 31 is comprised of a unique combination of a base support, a heating system to heat the magnetic wafers to the Curie temperature; a magnet system with a base and shorting bar; a rotatable disk assembly with the magnetic wafers and a support shaft/transfer means; and an output to an output means to the using device. These features and details of the device 31 are described above.

FIGS. 14 and 15 are examples of how to use the Special Thermo Magnetic Motor Device 31.

FIG. 14 is a view of a prototype that shows the side view of the prototype device 31A in operation with the heat means 50A operating on the upper wafer/buttons 71 in the wafer assembly 51 on the disk 52. The heated wafer assembly 50B is shown comprised of the two or more wafer assemblies 51 and the disk 52. The magnet 33, support 64, and the shorting bar 35 are depicted. The upward movement 73 of the uppermost heated wafer 50B ultimately turns the disk 52 and the output shaft 53. Further, the focused heat source 50A is shown on an uppermost wafer assembly 50B which, as it reaches its Curie Temperature, releases from the magnet 33 since it magnetic properties disappear or disengage when the Curie Temperature is reached. At this point the upper most wafer assembly 50B is released from the magnetic attraction of magnet 33 and then the next lower wafer assembly is attracted which causes the disk 52 and wafer assemblies 51 to rotate.

FIG. 15 is a view of a prototype 31A that shows an isometric of the device in operation with the heat means 50A operating on the upper buttons 50B. The components are the same as described for FIG. 14 with the upward movement 73 resulting in turning the output shaft 53.

Many current uses and methods to employ Special Thermo Magnetic Motor Device are evident to on skilled in the art of energy transfer through magnetic and thermodynamic means. For example, and not limitation, one could employ the unit a using device 63 such as in the exhaust system of a vehicle, such as an automobile or truck, to transfer exhaust heat and convert it to electricity. Similarly, it might be used in the exhaust of a bus or train to create electricity. In other exhaust systems such as a flue for an industrial furnace or a simple fireplace, the device could produce an electricity source. Even in a camp fire, the exhaust heat could employ the device to produce an amount of electricity to recharge device such as a cell phone, computer, flash light or the like.

With the above description it is to be understood that the Special Thermo Magnetic Motor Device 31 is not to be limited to only the disclosed embodiment. The features of the Special Thermo Magnetic Motor Device 31 are intended to cover various modifications and equivalent arrangements included within the spirit and scope of the description.

Addendum to the Disclosure

The addendum shown here is incorporated by reference and is the following overview magnets and is supplemental to the above description of the Special Thermo Magnetic Motor Device 31.

A. Diamagnetic, Paramagnetic, and Ferromagnetic Materials

When a material is placed within a magnetic field, the magnetic forces of the material's electrons will be affected. This effect is known as Faraday's Law of Magnetic Induction. However, materials can react quite differently to the presence of an external magnetic field. This reaction is dependent on a number of factors, such as the atomic and molecular structure of the material, and the net magnetic field associated with the atoms. The magnetic moments associated with atoms have three origins. These are the electron orbital motion, the change in orbital motion caused by an external magnetic field, and the spin of the electrons.

In most atoms, electrons occur in pairs. Electrons in a pair spin in opposite directions. So, when electrons are paired together, their opposite spins cause their magnetic fields to cancel each other. Therefore, no net magnetic field exists. Alternately, materials with some unpaired electrons will have a net magnetic field and will react more to an external field. Most materials can be classified as diamagnetic, paramagnetic or ferromagnetic.

Diamagnetic metals have a very weak and negative susceptibility to magnetic fields. Diamagnetic materials are slightly repelled by a magnetic field and the material does not retain the magnetic properties when the external field is removed. Diamagnetic materials are solids with all paired electron resulting in no permanent net magnetic moment per atom. Diamagnetic properties arise from the realignment of the electron orbits under the influence of an external magnetic field. Most elements in the periodic table, including copper, silver, and gold, are diamagnetic.

Paramagnetic metals have a small and positive susceptibility to magnetic fields. These materials are slightly attracted by a magnetic field and the material does not retain the magnetic properties when the external field is removed. Paramagnetic properties are due to the presence of some unpaired electrons, and from the realignment of the electron orbits caused by the external magnetic field. Paramagnetic materials include magnesium, molybdenum, lithium, and tantalum.

Ferromagnetic materials have a large and positive susceptibility to an external magnetic field. They exhibit a strong attraction to magnetic fields and are able to retain their magnetic properties after the external field has been removed. Ferromagnetic materials have some unpaired electrons so their atoms have a net magnetic moment. They get their strong magnetic properties due to the presence of magnetic domains. In these domains, large numbers of atom's moments ($10^{12}$ to $10^{15}$) are aligned parallel so that the magnetic force within the domain is strong. When a ferromagnetic material is in the un-magnitized state, the domains are nearly randomly organized and the net magnetic field for the part as a whole is zero. When a magnetizing force is applied, the domains become aligned to produce a strong magnetic field within the part. Iron, nickel, and cobalt are examples of ferromagnetic materials. Components with these materials are commonly inspected using the magnetic particle method.

B. Magnetic Fields in and around Horseshoe and Ring Magnets

Figure 17A:
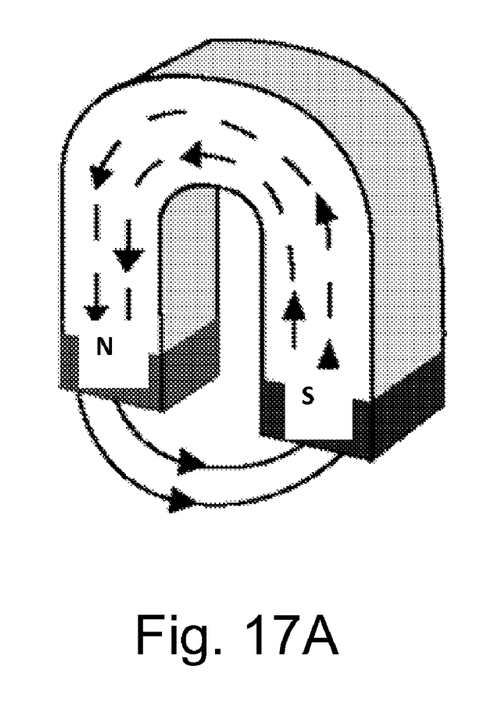
FIG. 17A is a horseshoe magnet which has north and south poles and 17B is a horseshoe magnet where a bar magnet was placed across the end.
Figure 17B:
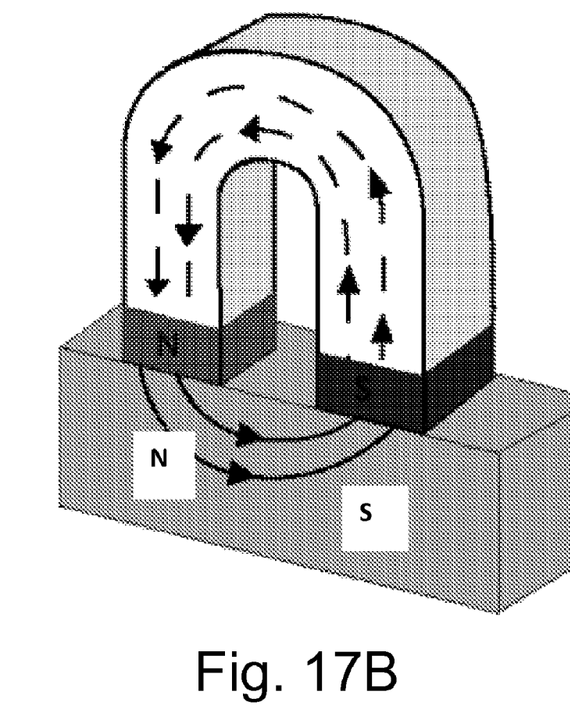

Magnets come in a variety of shapes and one of the more common is the horseshoe (U) magnet. FIG. 17A shows a horseshoe magnet which has north and south poles. The horseshoe magnet has north and south poles just like a bar magnet but the magnet is curved so the poles lie in the same plane. The magnetic lines of force flow from pole to pole just like in the bar magnet. However, since the poles are located closer together and a more direct path exists for the lines of flux to travel between the poles, the magnetic field is concentrated between the poles. If a bar magnet was placed across the end of a horseshoe magnet (FIG. 17B is a horseshoe magnet where a bar magnet was placed across the end) or if a magnet was formed in the shape of a ring, the lines of magnetic force would not even need to enter the air. The value of such a magnet where the magnetic field is completely contained with the material probably has limited use. However, it is important to understand that the magnetic field can flow in loop within a material.

C. General Properties of Magnetic Lines of Force

Figure 18:
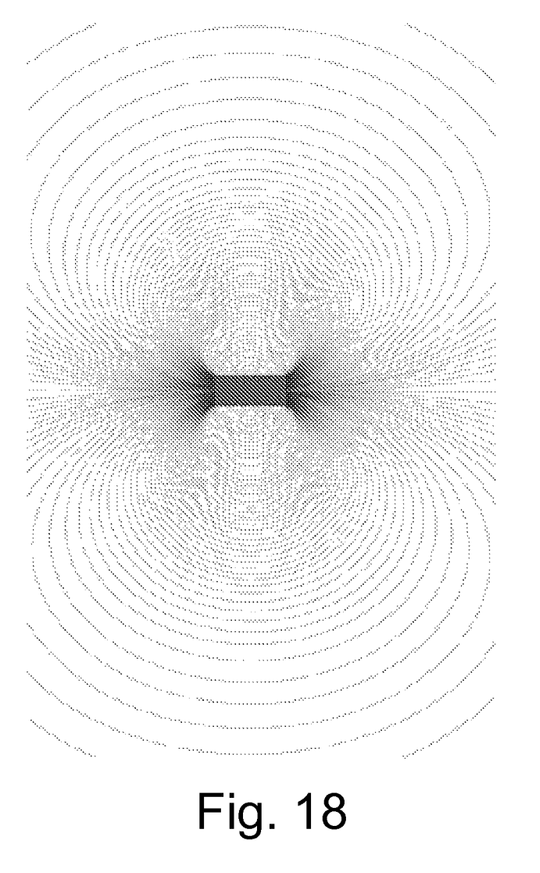
FIG. 18 is a view of magnetic lines of force.

FIG. 18 is a view of magnetic lines of force. Magnetic lines of force have a number of important properties, which include:

They seek the path of least resistance between opposite magnetic poles. In a single bar magnet as shown to the right, they attempt to form closed loops from pole to pole.

They never cross one another.

They all have the same strength.

Their density decreases (they spread out) when they move from an area of higher permeability to an area of lower permeability.

Their density decreases with increasing distance from the poles.

They are considered to have direction as if flowing, though no actual movement occurs.

They flow from the south pole to the north pole within a material and north pole to south pole in air.

D. Magnetic Properties of Some Minerals

| Mineral | Composition | Magnetic Order | $T_c$(°C) | ☐ (Am$^2$/kg) |
|---|---|---|---|---|
| Oxides | | | | |
| Magnetite | Fe$_3$O$_4$ | ferrimagnetic | 575-585 | 90-92 |
| Ulvospinel | Fe$_2$TiO$_2$ | AFM | −153 | |
| Hematite | ☐Fe$_2$O$_3$ | canted AFM | 675 | 0.4 |
| Ilmenite | FeTiO$_2$ | AFM | −233 | |
| Maghemite | ☐Fe$_2$O$_3$ | ferrimagnetic | ~600 | ~80 |
| Jacobsite | MNFe$_2$O$_4$ | ferrimagnetic | 300 | 77 |
| Trevorite | NiFe$_2$O$_4$ | ferrimagnetic | 585 | 51 |
| Magnesioferrite | MgFe$_2$O$_4$ | ferrimagnetic | 440 | 21 |
| Sulfides | | | | |
| Pyrrhotite | Fs$_7$S$_8$ | ferrimagnetic | 320 | ~20 |
| Greigite | Fe$_3$S$_4$ | ferrimagnetic | ~333 | ~25 |
| Troilite | FeS | AFM | 305 | |
| Oxyhydroxides | | | | |
| Goethite | ☐FeOOH | AFM, weak FM | ~120 | <1 |
| Lepidocrocite | ☐FeOOH | AFM(?) | −196 | |
| Feroxyhyte | ☐FeOOH | ferrimagnetic | ~180 | <10 |
| Metals & Alloys | | | | |
| Iron | Fe | FM | 770 | |
| Nickel | Ni | FM | 358 | 55 |
| Cobalt | Co | FM | 1131 | 161 |
| Awaruite | Ni$_3$Fe | FM | 620 | 120 |
| Wairauite | CoFe | FM | 986 | 235 |

FM = ferromagnetic order
AFM = anti-ferromagnetic order
$T_c$ = Curie or Néel Temperature
☐ = saturation magnetization at room-temperature

What is claimed is:

1. A Special Thermo Magnetic Motor Device (31) comprised of (a) a base support (65);

(b) a heating system (34);

(c) a magnet system (33A) with a base (64) and a shorting bar 35;

(d) a rotatable disk assembly 32 with more than one magnetic wafer assemblies 51 and a support shaft/transfer means 53 wherein the magnetic wafer assemblies (51) with a heat sink components (70), and a fastener (66) is inserted through a disk (52), and at an end opposite the disk (52) is a threaded fastener to fasten a magnetic wafer (71) to the disk (52) in order to comprise each disk assembly (32); and (e) an output transfer to an output means 62 to a using device 63 wherein the special device 31 may be used to create a motion from a thermo magnetic action and present it safely to the using device 63 for use.

2. The device according to claim 1 wherein the heat sink components (70) a composite material capable of transferring heat.

3. The device according to claim 1 wherein the heat sink components (70) is a metal.

4. The device according to claim 3 wherein the metal is copper.

5. The device according to claim 3 wherein the metal is aluminum.

6. The device according to claim 3 wherein the metal is bronze.

7. A Special Thermo Magnetic Motor Device (31) comprised of (a) a base support (65);

(b) a heating system (34);

(c) a magnet system (33A) with a base (64) and a shorting bar 35;

(d) a rotatable disk assembly 32 with more than one magnetic wafer assemblies 51 and a support shaft/transfer means 53 wherein the magnetic wafer assemblies (51) with a heat sink components (70), a fastener (66) is inserted through a disk (52), and at an end opposite the disk (52) is a securement means to fasten a magnetic wafer (71) to the disk (52) in order to comprise the disk assembly (32); and (e) an output transfer to an output means 62 to a using device 63 wherein the special device 31 may be used to create a motion from a thermo magnetic action and present it safely to the using device 63 for use.

8. The device according to claim 7 wherein the securement means is soldering.

9. The device according to claim 7 wherein the securement means is welding.

10. The device according to claim 7 wherein the securement means is friction welding.

11. The device according to claim 7 wherein the securement means is adhesives.

* * * * *